L. TRAXLER.
Safety Bridge for Railroad Cars.
No. 66,419. Patented July 2, 1867.
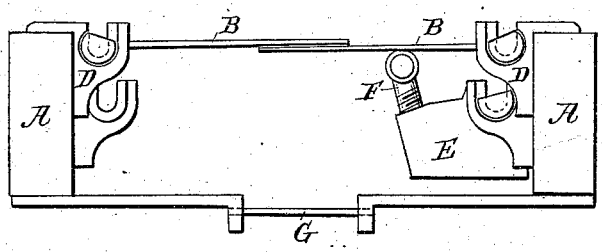
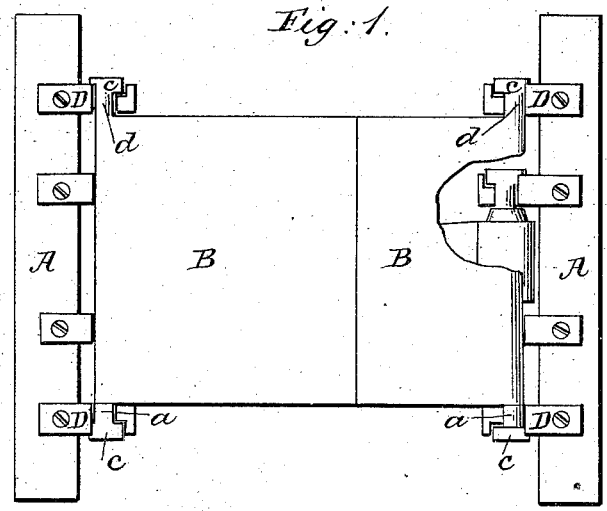
Witnesses
Thos Trusche
Fred B. Miles.
Inventor
Lester Traxler.
Per Munn & Co
Attorneys.

United States Patent Office.

LESTER TRAXLER, OF BUTLER, OHIO.

Letters Patent No. 66,419, dated July 2, 1867.

---

IMPROVED SAFETY-BRIDGE FOR RAILROAD CARS.

---

The Schedule referred to in these Letters Patent and making part of the same.

---

TO ALL WHOM IT MAY CONCERN:

Be it known that I, LESTER TRAXLER, of Butler, in the county of Richland, and State of Ohio, have invented a new and useful Improvement in Railroad-Car Safety-Bridge; and I do hereby declare that the following is a full, clear, and exact description thereof, which will enable others skilled in the art to make and use the same, reference being had to the accompanying drawings, forming part of this specification.

This invention relates to the manner in which a safe and commodious passage-way is formed from one railroad car to another; and it consists in a bridge composed of two leaves or wings, one of which is attached to the platform of each car by a hinge, so that they can be folded over each other; and also in the manner in which the leaves are supported and adjusted, as I will proceed to describe.

Figure 1 represents the bridge as connecting the platforms of two railroad cars, it being a plan or top view.

Figure 2 is a side view of the same, showing the manner in which the leaves are folded or lapped over each other, and the construction of the hinges by which they are attached to the platforms, also the manner in which they are supported and adjusted to the proper height.

Similar letters of reference indicate like parts.

A represents the platforms of two railroad cars. B represents the leaves or wings which form the bridge. These leaves are attached to bars which extend beyond the leaves and form journals or pivots, upon which they turn, as seen at $a$. On the ends of these journals there are collars, as seen at $c$. The boxes in which these journals turn are marked D, and are attached to the platform. These bearings for the journals $a$ are only half boxes, and on the outside of each there is a recess for the collar $c$, as seen in the drawing. The opening into this recess is less in width than the diameter of the collar $c$, but it will be noticed in fig. 2 that a portion of the collar is taken off, so that when the leaf is held in an inclined position the collar will enter the recess, but when it is dropped down, as represented in the drawing, it cannot be raised out of its recess. The device is important, as it prevents the leaves from being displaced by the jarring or motion of the cars. E represents a block of metal which is hung to the front of one of the platforms in the same manner that the leaves are, or so that it is easily detached and changed to any other car or to the other end of the same car. F is an adjusting-screw which enters the block E and extends up sufficiently far to allow one of the leaves to rest upon its head, as seen in fig. 2. G represents the car-coupling-link.

When the cars of different height are coupled together the screw is adjusted so as to allow one of the leaves to be properly inclined, and then the other leaf is folded on to it, as seen in the drawing. The boxes D are attached to each end of all the cars, and the leaves B and the adjusting-block and screw E F are attached or detached, as circumstances may require. It will be seen that by this arrangement a safe passage-way is made from one car to another, which cannot be disturbed or disarranged by the motion of the cars.

What I claim as new, and desire to secure by Letters Patent, is—

Forming a passage-way between the cars of a train by means of the wings B, boxes D, and adjusting-block and screw E F, the parts constructed and arranged substantially as herein shown and described for the purpose set forth.

LESTER TRAXLER.

Witnesses:
WILLIAM A. TRAXLER,
THOS. B. ANDREWS.